(12) United States Patent
Åström et al.

(10) Patent No.: US 10,623,161 B2
(45) Date of Patent: Apr. 14, 2020

(54) ALLOCATION OF SYNC SIGNALS WITH ALTERNATIVE FEATURES

(71) Applicant: Telefonaktiebolaget LM Ericsson (publ), Stockholm (SE)

(72) Inventors: Magnus Åström, Lund (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,711

(22) PCT Filed: Nov. 10, 2017

(86) PCT No.: PCT/EP2017/078881
§ 371 (c)(1),
(2) Date: Dec. 14, 2017

(87) PCT Pub. No.: WO2018/127319
PCT Pub. Date: Jul. 12, 2018

(65) Prior Publication Data
US 2018/0359070 A1    Dec. 13, 2018

Related U.S. Application Data

(60) Provisional application No. 62/442,694, filed on Jan. 5, 2017.

(51) Int. Cl.
*H04L 5/00* (2006.01)
*H04W 56/00* (2009.01)
(Continued)

(52) U.S. Cl.
CPC ........... *H04L 5/0051* (2013.01); *H04W 48/16* (2013.01); *H04W 56/0015* (2013.01); *H04W 72/0453* (2013.01); *H04W 72/10* (2013.01)

(58) Field of Classification Search
CPC .... H04L 5/0051; H04W 48/16; H04W 72/10; H04W 72/0453; H04W 56/0015
(Continued)

(56) References Cited

U.S. PATENT DOCUMENTS 6,865,240 B1    3/2005  Kawataka
2003/0161423 A1    8/2003  Satomi et al.
(Continued)

FOREIGN PATENT DOCUMENTS

EP    2879441 A1    6/2015

OTHER PUBLICATIONS

International Search Report and Written Opinion for International Patent Application No. PCT/EP2017/077883, dated Mar. 29, 2018, 14 pages.
(Continued)

*Primary Examiner* — Kwang B Yao
*Assistant Examiner* — Syed M Bokhari
(74) *Attorney, Agent, or Firm* — Withrow & Terranova, PLLC (57) ABSTRACT

A method of operation of a network node in a wireless communications network comprises determining a set of sync signal features for a sync signal to be transmitted by either the network node or another network node. The method further comprises determining a sync frequency location for the sync signal based on the set of sync signal features for the sync signal to be transmitted and transmitting or causing transmission of the sync signal on the sync frequency location. A method of a wireless communication device for performing synchronization to a wireless communications network comprises determining a set of sync signal features for a sync signal to be searched for by the wireless communication device and determining a set of sync frequency locations defined for the set of sync signal (Continued)

features for a cellular band and searching for a sync signal in the set of sync frequency locations.

22 Claims, 10 Drawing Sheets

(51) Int. Cl.
*H04W 48/16* (2009.01)
*H04W 72/04* (2009.01)
*H04W 72/10* (2009.01)

(58) Field of Classification Search
USPC .................................. 370/329, 328, 350, 330
See application file for complete search history.

(56) References Cited

U.S. PATENT DOCUMENTS

| | | | | |
|---|---|---|---|---|
| 2009/0067370 A1* | 3/2009 | Kim | ...................... | H04B 1/7083 370/328 |
| 2010/0040015 A1* | 2/2010 | Ernstrom | .............. | H04W 56/00 370/330 |
| 2012/0270537 A1 | 10/2012 | Weng et al. | | |
| 2012/0281629 A1 | 11/2012 | Zhou et al. | | |
| 2013/0250818 A1 | 9/2013 | Gaal et al. | | |
| 2014/0050206 A1 | 2/2014 | Seo et al. | | |
| 2015/0208296 A1 | 7/2015 | Song et al. | | |
| 2015/0304079 A1* | 10/2015 | Kim | ...................... | H04W 56/00 370/350 |
| 2015/0319723 A1 | 11/2015 | Korhonen et al. | | |
| 2016/0013879 A1 | 1/2016 | Webb et al. | | |
| 2016/0088625 A1 | 3/2016 | Kadous et al. | | |
| 2016/0135179 A1 | 5/2016 | Yin et al. | | |
| 2016/0212568 A1* | 7/2016 | Ji | ......................... | H04W 56/00 |
| 2017/0094621 A1 | 3/2017 | Xu et al. | | |
| 2018/0092084 A1 | 3/2018 | Yun et al. | | |
| 2018/0109995 A1 | 4/2018 | Akkarakaran et al. | | |
| 2018/0132200 A1 | 5/2018 | Gheorghiu et al. | | |
| 2018/0139715 A1* | 5/2018 | Ly | ...................... | H04W 56/0025 |
| 2018/0176065 A1 | 6/2018 | Deng et al. | | |
| 2018/0241525 A1 | 8/2018 | Ouchi et al. | | |

OTHER PUBLICATIONS

Ericsson, "R1-1611899: NR Synchronization Signal Frequency Raster," Third Generation Partnership Project (3GPP)—TSG-RAN WG1 Meeting #87, Nov. 14-18, 2015, 4 pages, Reno, Nevada.

Ericsson, "R1-1700293: NR SS Frequency Raster," Third Generation Partnership Project (3GPP) TSG-RAN WG1 NR adhoc, Jan. 16-20, 2017, 6 pages, Spokane, Washington.

Ericsson, "R1-1700294: NR SS Burst Set Periodicity," Third Generation Partnership Project (3GPP) TSG-RAN WG1 NR AH 1701, Jan. 16-20, 2017, 4 pages, Spokane, Washington.

Huawei et al., "R1-1611035: Wf on Synchronization and Carrier Rasters," Third Generation Partnership Project (3GPP) TGS RAN WG1 #86bis, Oct. 10-14, 2016, 3 pages, Lisbon, Portugal.

Huawei et al., "R1-1611693: Frequency Location of the Synchronization Signals," Third Generation Partnership Project (3GPP) TSG RAN WG1 Meeting #87, Nov. 14-18, 2016, 5 pages, Reno, USA.

Intel Corporation, "R1-1611965: Frequency Raster of SS," Third Generation Partnership Project (3GPP) TSG RAN WG1 Meeting #87, Nov. 14-18, 2016, 3 pages, Reno, USA.

Nokia et al., "R1-1612802: On Synchronization Signal Frequency Raster," Third Generation Partnership Project (3GPP) TSG-RAN WG1#87, Nov. 14-18, 2016, 2 pages, Reno, USA.

Qualcomm Incorporated, "R1-1610156: Single Beam Synchronization Design," Third Generation Partnership Project (3GPP) TSG-RAN WG1 #86b, Sep. 10-14, 2016, 6 pages, Lisbon, Portugal.

Qualcomm Incorporated, "R1-1612022: Sync Raster Considerations Below 6GHz," Third Generation Partnership Project (3GPP) TSG-RAN WG1 #87, Nov. 14-18, 2016, 4 pages, Reno, USA.

Samsung, "R1-1612453: Carrier Raster and Synchronization Signal Transmission," Third Generation Partnership Project (3GPP) TSG RAN WG1 Meeting #87, Nov. 14-18, 2016, 3 pages, Reno, USA.

Huawei et al., "R1-1611684: Email discussion [86b-20] on synchronization and carrier rasters for NR," Third Generation Partnership Project (3GPP) TSG RAN WG1 Meeting #87, Nov. 14-18, 2016, 11 pages, Reno, USA.

International Search Report and Written Opinion for International Patent Application No. PCT/EP2017/078881, dated Jan. 16, 2018, 16 pages.

Non-Final Office Action and Examiner-Initiated Interview Summary for U.S. Appl. No. 15/736,670, dated Mar. 21, 2019, 31 pages.

Final Office Action and Examiner-Initiated Interview Summary for U.S. Appl. No. 15/736,670, dated Sep. 6, 2019, 28 pages.

Advisory Action for U.S. Appl. No. 15/736,670, dated Nov. 11, 2019, 3 pages.

* cited by examiner

ALLOCATION OF SYNC SIGNALS WITH ALTERNATIVE FEATURES

This application is a 35 U.S.C. § 371 national phase filing of International Application No. PCT/EP2017/078881, filed Nov. 10, 2017, which claims the benefit of U.S. Provisional Application No. 62/442,694, filed Jan. 5, 2017, the disclosures of which are incorporated herein by reference in their entireties.

TECHNICAL FIELD

The present disclosure relates to synchronization in a cellular communications system and, in particular, synchronization (sync) frequency allocation in a cellular communications system.

BACKGROUND

Initial Access (IA) is the process of powering on a wireless device such as a User Equipment device (UE) in order for it to access the cellular network. There are three steps in this procedure, which are fairly independent of which Radio Access Technology (RAT) is being used (the below is inspired by Long Term Evolution (LTE)):
1. Cell search—acquiring network symbol and frequency synchronization (sync) to the network and obtaining fundamental cell information, e.g., the cell Identity (ID), for cell selection.
2. Receiving system information—receiving further cell and network information defining cell and network properties, e.g., operator, carrier bandwidth, system frame number, access information, and adjacent cell information.
3. Random access procedure—this is the step where the UE signals its presence to the network in order for the network to be able to page or schedule it.

In order to transmit and receive signals at a specific carrier frequency, a transceiver (both base station and device) needs to translate a baseband signal to/from the carrier frequency. This is done by mixing a signal with a local version of the carrier frequency generated in the local oscillator (LO). A LO, in turn, derives its output signal from a crystal oscillator (XO) from which a signal with a fundamental frequency is up-converted or modulated to the desired carrier frequency. The open loop (i.e., prior to the LO having locked to the carrier frequency) relative frequency inaccuracy in a crystal is typically 10-50 parts per million (ppm) depending on the XO frequency and quality. Typically, an XO with higher resonance frequency is needed for higher carrier frequencies in order to cope with the phase noise. However, the higher reference frequency for the XO results in higher relative inaccuracy. This implies that higher New Radio (NR) carrier frequencies will face a fivefold relative frequency inaccuracy compared to LTE at 2-3 gigahertz (GHz). Note that NR is a term used to refer to Third Generation Partnership Project (3GPP) Fifth Generation (5G) NR.

LTE comprises two synchronization (sync) signals, the Primary Synchronization Signal (PSS) and the Secondary Synchronization Signal (SSS), that are used in order to establish symbol and frequency sync and to obtain, e.g., cell identity (ID). The PSS is used in order to get an initial frequency lock (±4 kilohertz (kHz)) which is further refined in the SSS.

Figure 1:
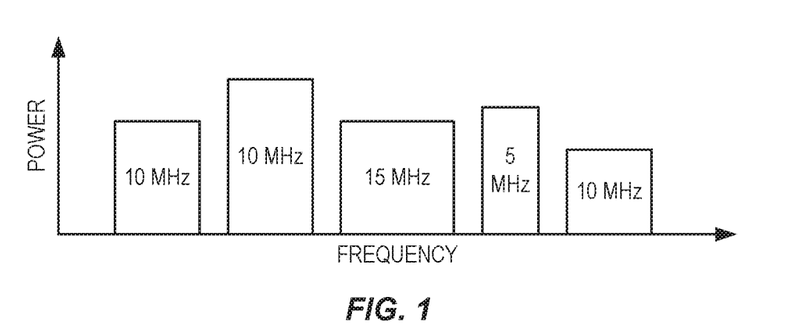
FIG. 1 is an illustration of a frequency scan over a complete, cellular band.
Figure 2:
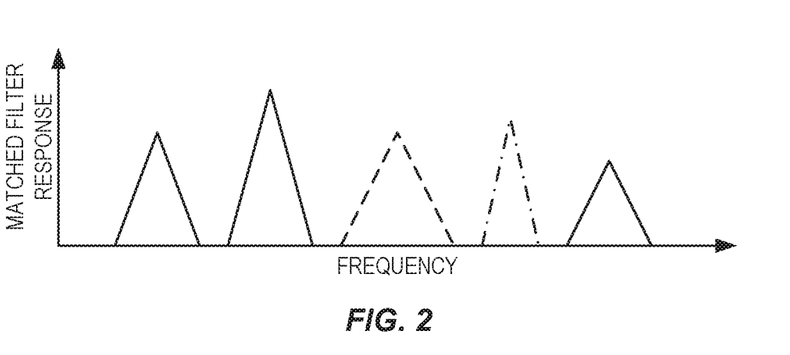
FIG. 2 illustrates results of a matched filtering operation for the frequency scan of FIG. 1.
Figure 3:
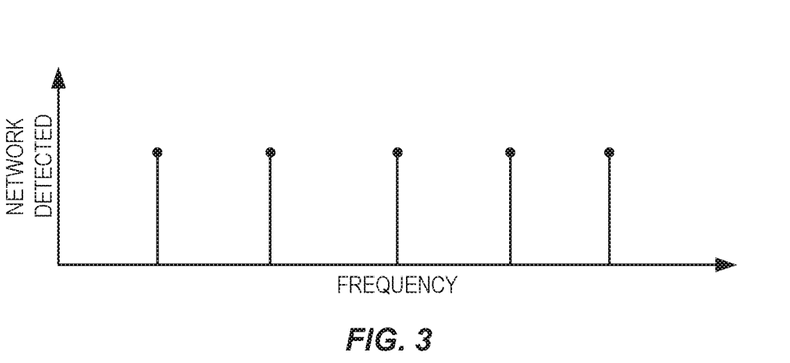
FIG. 3 illustrates frequency locations to be searched for synchronization (sync) signals based on the results of the matched filtering operation of FIG. 2.

In order to identify prospect sync frequencies, the UE may, in some prior art solutions, perform a frequency scan over the complete frequency band, as illustrated in FIG. 1. From the frequency scan, the UE may obtain the individual frequency carriers from a matched filtering operation in which the LTE spectrum shape is used, typically one shape for each LTE bandwidth, as is illustrated in FIG. 2. FIG. 2 illustrates results of a matched filtering operation for the frequency scan of FIG. 1. This gives the UE an initial understanding of what carrier bandwidths are present in the frequency band, where, and, consequently, at what frequencies to search for PSS and SSS since their positions are fixed to the center of the system bandwidth, as is illustrated in FIG. 3. FIG. 3 illustrates frequency locations to be searched for synchronization signals based on the results of the matched filer operation of FIG. 2. Notably, FIG. 3 is a simplification in that multiple frequencies are typically tested around each peak.

The above identified cell search positions are quite inaccurate though. Furthermore, a simple spectrum analysis does not take into account the possible frequency error that may be present in the UE. Hence, for each identified position, and possibly also adjacent alternative frequencies, there is a need to manage the large initial frequency errors that may be expected at power on, typically up to ±30 kHz at 2.6 GHz. This is done by a grid search in which different frequency error hypotheses are tested in order to identify the most likely one, i.e., the frequency error for which the likelihood of an existing PSS is maximized. Having done that, the UE may continue its cell search procedure by receiving the SSS.

The ambition of the Fifth Generation (5G) cellular system, or New Radio (NR), is to be a one stop shop for connectivity. Hence, a wide and sometimes contradictory requirements specification has been defined by 3GPP. Some of these requirements, and their effect on cell search is described below:

Lean carrier, implying a minimal signaling overhead, in particular regarding broadcast transmissions such as sync signals and broadcast channels. With respect to sync, this may be directly translated to a large sync periodicity.

Flexible band utilization, implying narrow specialized, local networks, e.g., for factory connectivity, should be possible to combine with general purpose, wide area, mobile broadband networks. One parameter in a flexible band utilization is a narrow sync frequency raster such that there are many locations to position sync, in turn providing large network configuration flexibility.

Low sync complexity, such that an initial cell search does not perform worse compared to today's Fourth Generation (4G) LTE networks. Complexity is typically proportional to the sync period and inversely proportional to the sync frequency raster. Dense raster and dense periodicity amount to similar complexity as sparse raster and sparse periodicity.

SUMMARY

Contradictory requirements on the sync signals are complexity and flexibility. In addition to that there is a requirement on NR to be lean such that the overhead signaling is kept to a minimum. A low complexity, implying few sync positions with frequent occurrence, is preferred since User Equipment devices (UEs) will have fewer frequency positions and shorter time period to look for sync. Simultaneously, a high flexibility, implying many sync locations, is desirable in order to allow for flexible and efficient spectrum utilization. A lean RAT, implying minimal overhead and thus long sync periods, is required for reduced Operating Expense (OPEX) and co-channel interference. The present disclosure provides methods in which these contradictory requirements may advantageously all be met in an efficient and satisfactory manner.

According to a first aspect of the disclosure, method of operation of a network node in a wireless communications network is provided. The method comprises determining a set of sync signal features for a sync signal to be transmitted by either the network node or another network node. The method further comprises determining a sync frequency location for the sync signal based on the set of sync signal features for the sync signal to be transmitted; and transmitting or causing transmission of the sync signal on the sync frequency location.

According to a second aspect, a network node is provided that is adapted to perform the method according to the first aspect.

According to a third aspect of the disclosure, method of a wireless communication device for performing synchronization to a wireless communications network, is provided. The method comprises determining a set of sync signal features for a sync signal to be searched for by the wireless communication device. The method further comprises determining a set of sync frequency locations defined for the set of sync signal features for a cellular band; and searching for a sync signal in the set of sync frequency locations.

According to a fourth aspect, a wireless communication device is provided that is adapted to perform the method according to the third aspect.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The present disclosure is related to a method in a base station for allocating synchronization (sync) signals within a frequency band, where the sync position depends on one or more sync features, and related to a method in a User Equipment device (UE) for detecting a sync signal where the sync position depends on one or more sync features. Hence, one set of sync positions is reserved for one set of features, whereas another set of sync positions is reserved for another set of features. It may also be that a deviating feature is allowed on a subset of sync positions but the standard feature is always allowed.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a g Node B (gNB) in a 3GPP New Radio (NR) network, a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Cellular Band: As used herein, a "cellular band" is a total frequency band allocated for a cellular radio access technology. As an example, LTE Band 7 at 2.6 gigahertz (GHz), which is the frequency band from 2620-2690 megahertz (MHz)) is a cellular band. Typically, multiple carrier bands are implemented within a cellular band. Note that a "cellular band" is also referred to herein as a "Radio Access Technology (RAT) band."

Carrier Band: As used herein, a "carrier band" is a frequency band allocated to a particular carrier within a cellular band. For example, multiple carriers may be implemented within a single cellular band, where each carrier has a respective carrier band within the cellular band. As an example, multiple LTE carriers, each having its own respective carrier band, may be implemented within LTE Band 7. Note that a "carrier band" may also be referred to herein as a "network band," a "system band," a "system bandwidth," or a "network node system bandwidth."

Synchronization (sync) Frequency Location: As used herein, a sync frequency location is a frequency band in which a sync signal is transmitted. For example, a sync frequency location may be a 5 MHz frequency band within a carrier band, where the corresponding sync signal is transmitted within that 5 MHz frequency band. A sync frequency location may be defined in any suitable manner such as, for example, a center frequency and bandwidth, an edge frequency and a bandwidth, or two edge frequencies (i.e., the lower and upper frequencies defining the sync frequency location). Sync frequency location is also referred to herein as a sync frequency position or sync position.

Synchronization (sync) Signal Feature: As used herein, a "feature" of a sync signal or a "sync signal feature" is a bandwidth of the sync signal, a time duration of the sync signal, a periodicity of the sync signal, a frequency raster of the sync signal (i.e., the distance, in frequency, between two adjacent sync signals), a waveform used for the sync signal (e.g., Zadoff-Chu variant (e.g., sequence length, number of repetitions, spacing structure, etc.), random noise, etc.), or interpretation of the sync signal (i.e., a sync signal index may be interpreted differently from the usual sync signal). With regard to a sync signal index that may be interpreted differently from the usual sync signal, the idea is that, e.g., the transmitted SSS will be one out of a set of possible SSSs. The selected SSS may implicitly carry information such as cell ID, cell properties etc. By using another sync signal setup, these properties are also likely to differ although the same SSS index (but a different SSS waveform).

Frequency Raster: As used herein, a "frequency raster" corresponds to periodicity in the frequency domain. It is the distance in the frequency domain between two possible (allowed) sync positions.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Further note that, in the description herein, reference may be made to the term "cell"; however, particularly with respect to Fifth Generation (5G) or NR concepts, beams may be used instead of cells and, as such, it is important to note that the concepts described herein are equally applicable to both cells and beams.

Existing synchronization (sync) schemes or designs are assisted by first estimating the frequency band power spectrum and from that determining likely sync positions. That approach is not possible in New Radio (NR) since in a lean Radio Access Technology (RAT) no assumptions regarding transmission power may be made. Hence, a new sync search approach is needed in order to avoid having to sequentially search all possible sync locations. The problem with that is that contradictory requirements in terms of power, complexity, and flexibility imply that a simple sync raster is not sufficient.

Figure 4:
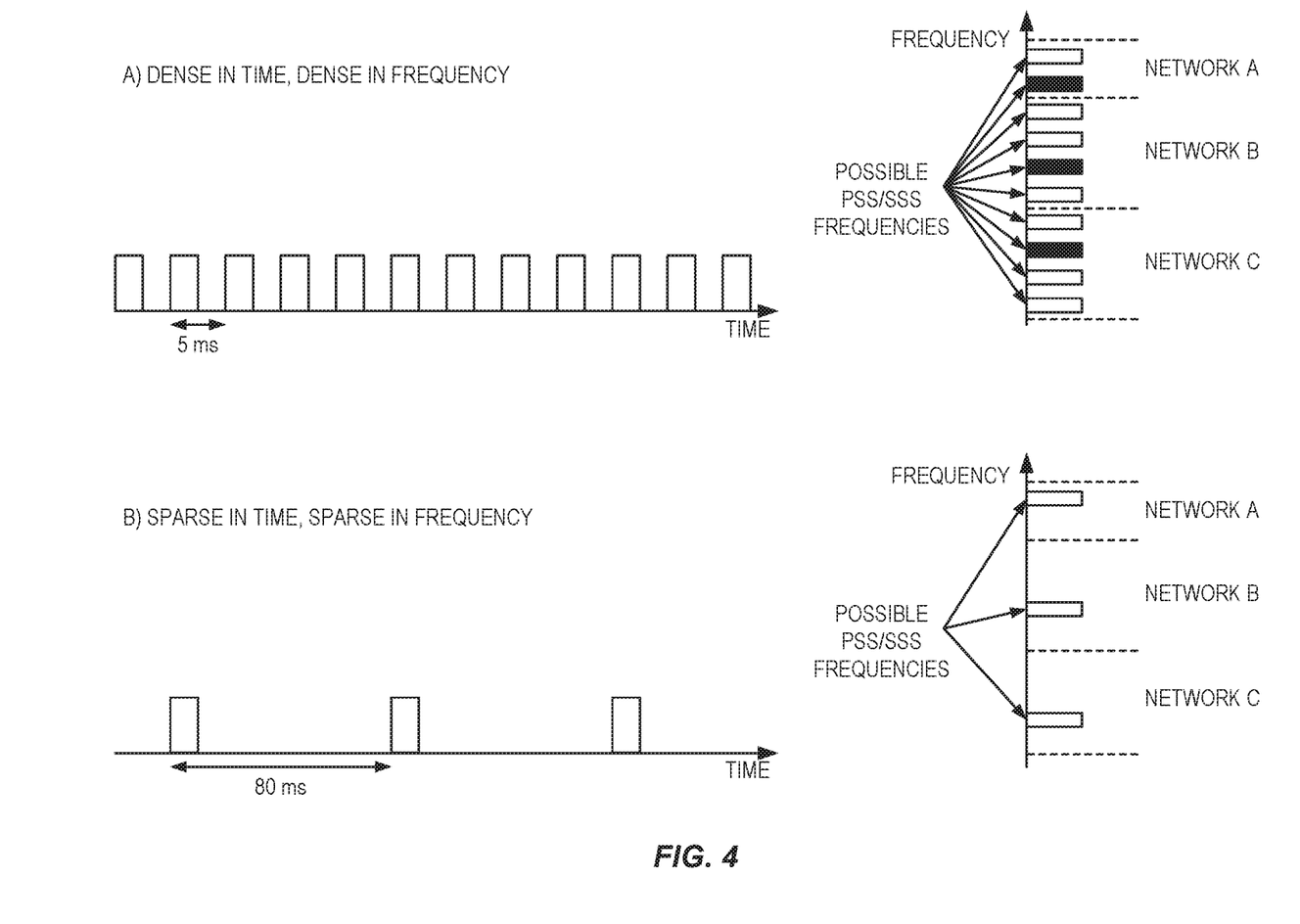
FIG. 4 illustrates problems associated with prior art solutions.

FIG. 4 illustrates problems associated with prior art solutions. FIG. 4 illustrates sync alternatives with a constant sync detection complexity for three networks, which are shown as Networks A, B, and C, and assuming that these networks are active in a cellular band (i.e., a RAT frequency band) and that each carrier needs one synchronization signal. For a fixed search complexity, a sync signal allocation scheme or sync signal time-frequency/location grid that is dense in time and dense in frequency (as shown in (a)) or instead sparse in time and sparse in frequency (as shown in (b)) can be defined. The sync detection complexity proportional to the sync time period and inversely proportional to the sync frequency raster. The time to reach sync is related to sync detection complexity, depending on implementation.

The conflicting sync requirements are difficult to achieve with a single, fixed sync periodicity. Hence there is a need for a novel sync raster allocation scheme allowing all the above constraints to be fulfilled.

Figure 5:
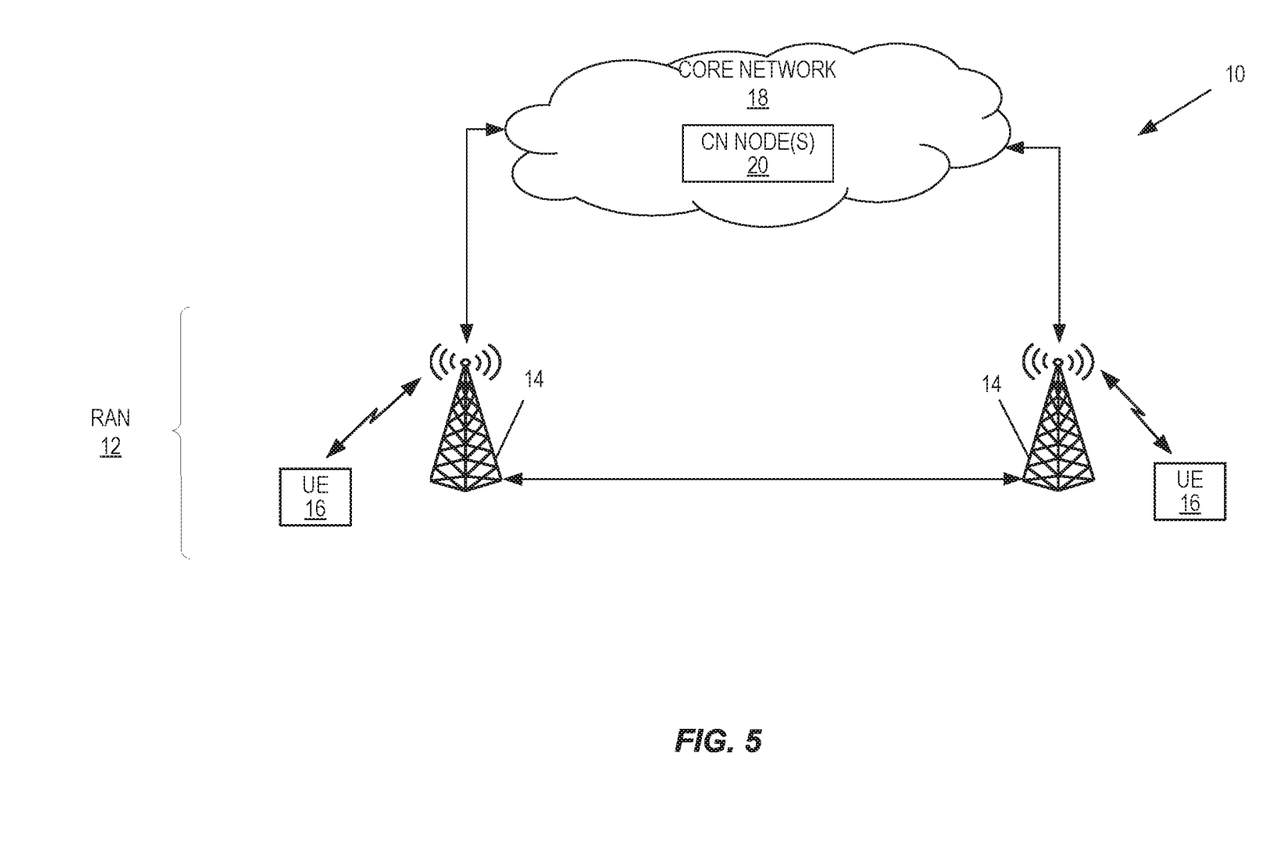
FIG. 5 illustrates one example of a cellular communications system in which embodiments of the present disclosure may be implemented.

FIG. 5 illustrates one example of a cellular communications system 10 in which embodiments of the present disclosure may be implemented. As illustrated, the cellular communications system 10 includes a Radio Access Network (RAN) 12 that includes a number of radio access nodes 14 (e.g., base stations such as, e.g., 5G NR base stations (referred to as g Node Bs (gNBs)). In some embodiments, the RAN 12 is a 5G NR RAN and the radio access nodes 14 are gNBs, where gNB is a term used to refer to 5G NR base stations. The radio access nodes 14 provide wireless, or radio, access to UEs 16 via corresponding cells or beams.

The radio access nodes 14 are connected to a core network 18. The core network 18 includes one or more core network nodes 20 such as, for example, Mobility Management Entities (MMEs), Serving Gateways (S-GWs), Packet Data Network Gateways (P-GWs), and/or the like.

The present disclosure presents embodiments of a method to handle the contradictory requirements on the sync signal within a frequency band such that a first set of sync frequency locations are allocated to sync signals having a first set of features whereas a second set of sync frequency locations are allocated to sync signals having a second set of features. A feature, in this case, is e.g., sync periodicity, such that at some sync frequencies a longer periodicity may be used, whereas in other sync frequencies another sync periodicity may be used. An example of the former may be a traditional regional or national cellular Mobile Broadband (MBB) network for which idle mode may be of importance, whereas the latter may be a local factory network where network costs may be negligible relative to other factory costs. Examples of features of a sync signal are: bandwidth, time duration, periodicity, frequency raster (i.e., spacing between two sync signals), waveform (e.g., different Zadoff-Chu variants (e.g., sequence lengths, number of repetitions, spacing structures, etc.), random noise, etc), and interpretation (i.e., a sync signal index may be interpreted differently from the usual sync signal).

Figure 6:
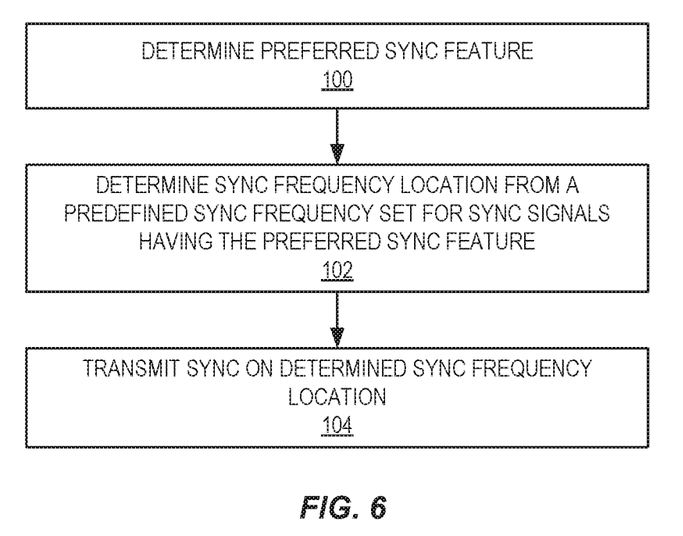
FIG. 6 presents a flow chart that illustrates the operation of a network node (e.g., a radio access node) according to some embodiments of the present disclosure.

FIG. 6 is a flow chart that illustrates the operation of a network node (e.g., a radio access node 14) according to some embodiments of the present disclosure. As shown in FIG. 6, the network node starts by determining a preferred sync signal feature for a sync signal to be transmitted (step 100). Such a feature may, in one embodiment, be sync periodicity, in other embodiments it may be specialized Narrowband Internet of Things (NB-IoT) sync waveforms or some other feature (e.g., bandwidth, time duration, frequency raster, or interpretation). While this example uses a single sync signal feature, the process is equally applicable to a set of sync signal features, where the set may include one or more but potentially multiple sync signal features. Note that the network node may determine the preferred sync signal feature in any suitable manner. For example, if the network node is a gNB, the gNB may be programmed to prefer a long sync period and will thus determine that the long sync signal is a preferred sync signal feature for the sync signal to be transmitted by the gNB.

Having determined the preferred sync feature, the network node then determines a sync frequency location for the sync signal to be transmitted (step 102). More specifically, based on the preferred sync feature, the network node determines the set of sync frequency locations defined for that preferred sync feature. The set of sync frequency locations defined for the preferred sync feature may be, for example, every $k^{th}$ sync frequency location in the predefined set of all sync frequency locations for the cellular band. Note that a second set of sync frequency locations is defined for a second set of sync signal features, and a first sync frequency location in the second set of sync frequency locations is offset by a predefined or preconfigured value m relative to a first sync frequency location in the set of sync frequency locations. The network node then determines one of the sync frequency locations in the set of sync frequency locations defined for the preferred sync feature as the sync frequency location to use for transmission of the sync signal. For example, the network node may use any suitable search or selection technique to select one of the set of sync frequency locations (which span the cellular band) that falls within the carrier band in which the sync signal is to be transmitted. Finally, the network node transmits, or alternatively causes another network node to transmit, the sync signal on the determined sync frequency location (step 104).

Determining the sync frequency location in step 102 may be done, e.g., from a priori knowledge that a sync signal having a first set of features belongs to a first set of sync frequency locations, whereas a sync signal having a second set of features belongs to a second set of sync frequency locations. More specifically, in some embodiments, the sync frequency location determined in step 102 is determined from a predefined sync frequency set that includes multiple sync frequency locations that are allowed for sync signal transmission for sync signals having the determined preferred sync signal feature(s) within the cellular band. For instance, in some embodiments, a predefined set of sync frequency locations that are allowed for the cellular band is obtained, e.g., from a standard specification, a mathematical formula, or the like. This set of sync frequency locations allowed for the cellular band divided into different sets of sync frequency locations for different sets of sync signal features. Thus, a set of sync frequency locations for a set of sync signal features is a subset of the set of sync frequency locations for the carrier band. For example, a first set of sync frequency locations may be defined for a first set of sync signal features and a second set of sync frequency locations may be defined for a second set of sync signal features. Additional sets of sync frequency locations may be defined for additional sync signal features (i.e., there may be more than two sets of sync frequency locations for more than two sets of sync signal features, respectively). Then, in step 102, the determined sync frequency location (which is for the desired carrier band) is determined from the set of sync frequency locations for the set of sync signal features that corresponds to the preferred sync signal feature, or preferred sync signal feature set, determined in step 100. For example, the network node may search the set of sync frequency locations defined for the set of sync signal features to find a sync frequency location within a carrier band in which the sync signal is to be transmitted. Any suitable search or selection technique may be used. For example, the network node may utilize a binary search tree to search (and possibly compute), e.g., a highest prioritized sync frequency location within the carrier band from the set of sync frequency locations defined for the set of sync features.

In some embodiments, a first set of sync frequency locations for a first set of sync signal features (or likewise a first sync signal feature) is a first, wider sync raster, whereas a second set of sync frequency locations for a second set of sync signal features (or likewise a second sync signal feature) may be a second, narrower raster set where the points in the narrower raster set fall between the points in the wider raster set. Examples of this are shown in FIGS. 7 and 8.

Figure 7:
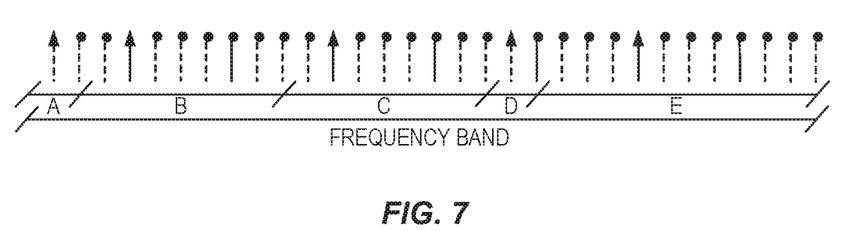
FIGS. 7 through 10 illustrate examples of various embodiments of the present disclosure.

In FIG. 7, an example of selected sync positions for five networks (Networks A, B, C, D, and E) is illustrated, where solid arrows and lines with bullets identify the wider raster that defines the set of sync frequency locations for the first set of sync signal features. The dashed arrows and lines with bullets identify the narrower raster that defines the set of sync frequency locations for the second set of sync signal features. The selected sync frequency locations for the networks (i.e., for the carrier bands) are illustrated as solid arrows for the first set of sync signal features and dashed arrows for the second set of sync signal features.

Figure 8:
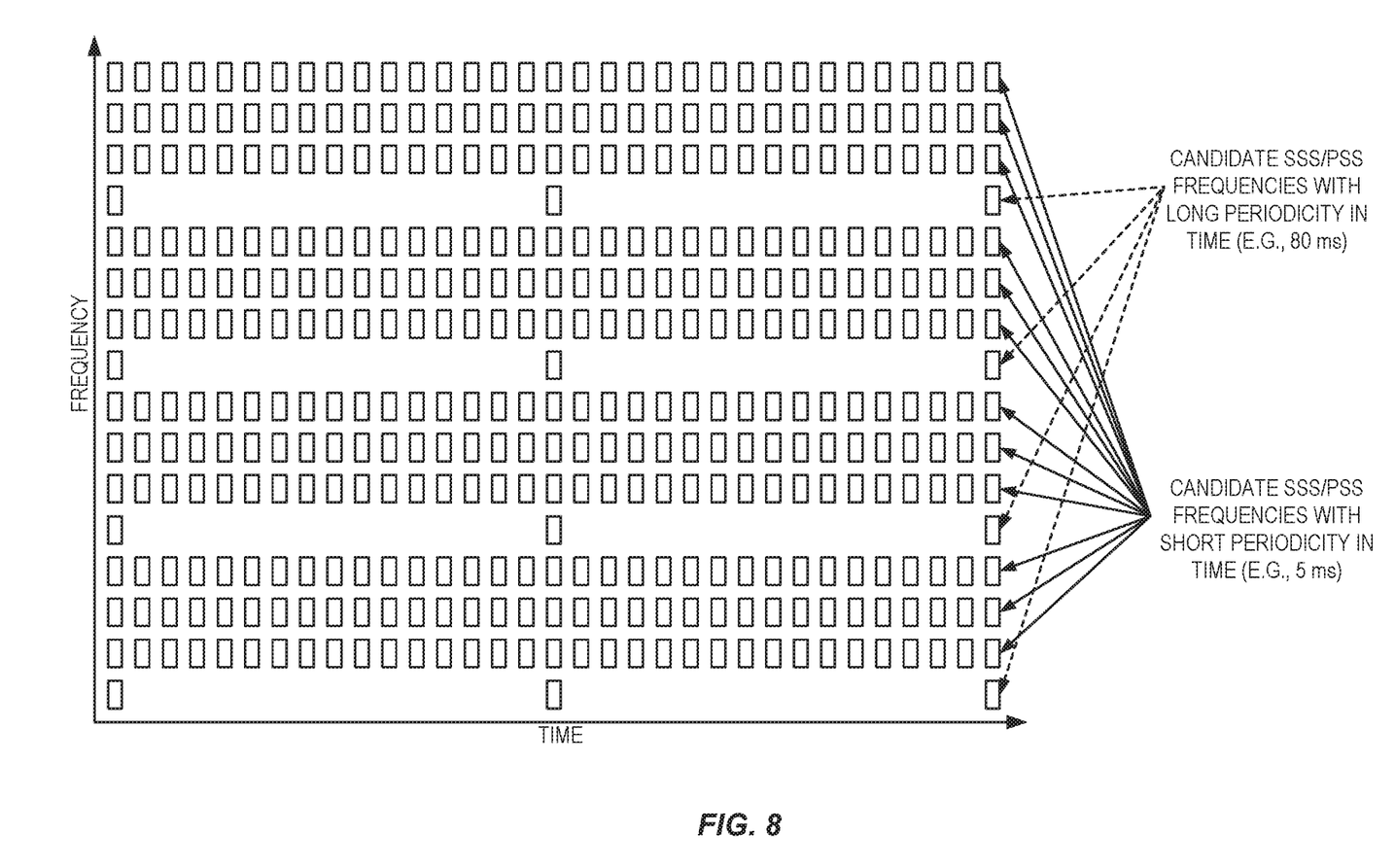

In the example of FIG. 8, the first set of sync frequency locations and the second set of sync frequency locations are for different sync signal periodicities. Note that, in some embodiments, the first set is a subset of the second set, i.e., a default set of features are valid for all sync locations but a deviating set is valid for only a subset of the sync locations, or vice versa.

Figure 9:
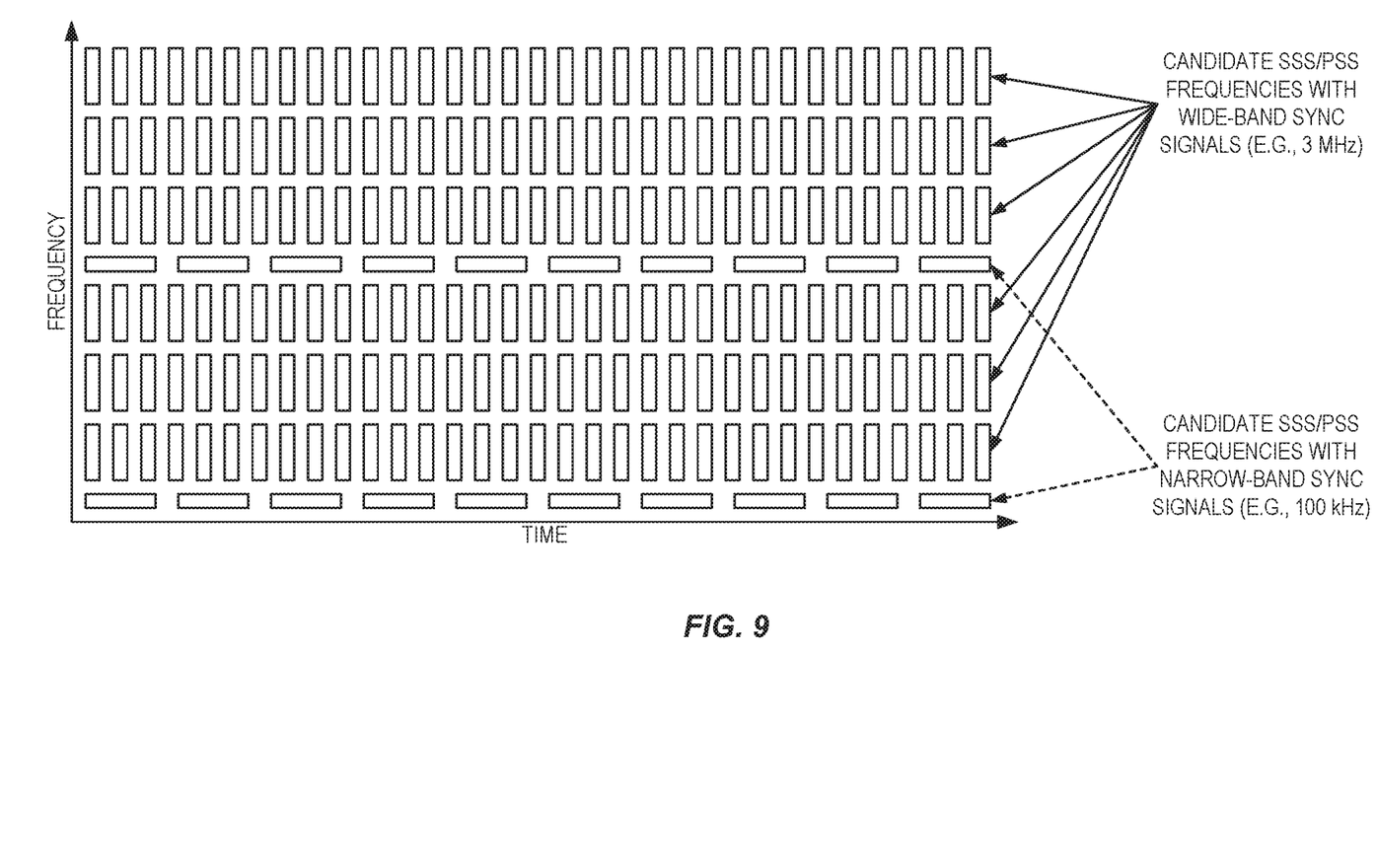

In some other embodiments, other features of the sync signal may be concerned. FIG. 9 presents an embodiment where a sync signal with different time-bandwidth properties has been allocated on every fourth frequency sync location. In other words, the first and second sets of sync frequency locations are for different sync signal bandwidths and time durations.

Figure 10:
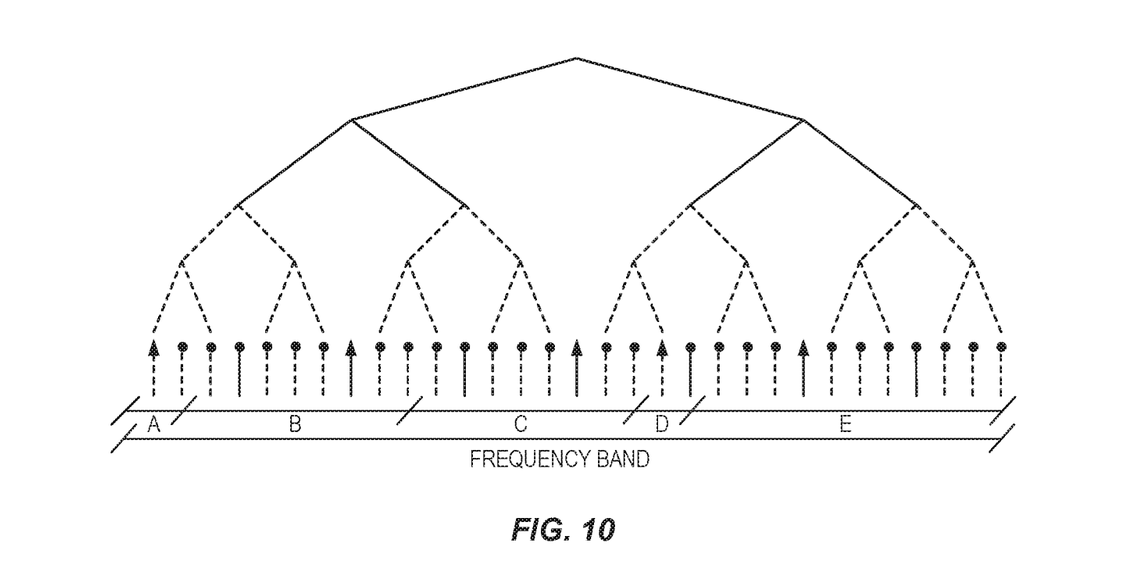

In some alternative embodiments, the first and second sets of sync frequency locations may be hierarchically structured such that one of the sets of sync frequency locations (e.g., the first set of sync frequency locations) is given higher priority than the other one of the sets of sync frequency locations (e.g., the second set of sync frequency locations). One example is illustrated in FIG. 10. In the example of FIG. 10, the first set of sync frequency locations corresponds to the solid lines in the hierarchical tree, whereas the second set of sync frequency locations corresponds to the dashed lines in the hierarchical tree. The first set of sync frequency locations corresponding to the solid lines in the hierarchical tree of FIG. 10 are referred to herein as being at "higher levels" within the hierarchical tree than the second set of sync frequency locations corresponding to the dashed lines in the hierarchical tree of FIG. 10. Thus, nodes in the hierarchical tree that are closer to the top of the hierarchical tree (i.e., where the top of the hierarchical tree is the root of the tree if FIG. 10 is presented in an inverted tree form) are referred to as being higher levels in the hierarchical tree. In this case, the priority is associated with sync signal features such that a first set of sync signal features is reserved to higher prioritized sync frequency locations whereas another set of sync signal features is reserved for lower prioritized sync frequency locations.

In some embodiments, the first set of sync signal features may be comprised in the second set of sync signal features such that the first set of sync signal features are also acceptable in the second set of sync frequency locations, whereas the opposite, that the second set of sync signal features are allowed on the first set of sync frequency locations, is not.

In some other embodiments, the second set of sync signal features may be comprised in the first set of sync signal features such that the second set of sync signal features are also acceptable on the first set of sync frequency locations, whereas the opposite, that the first sync signal feature is allowed on the second set of sync frequency locations, is not.

Figure 11:
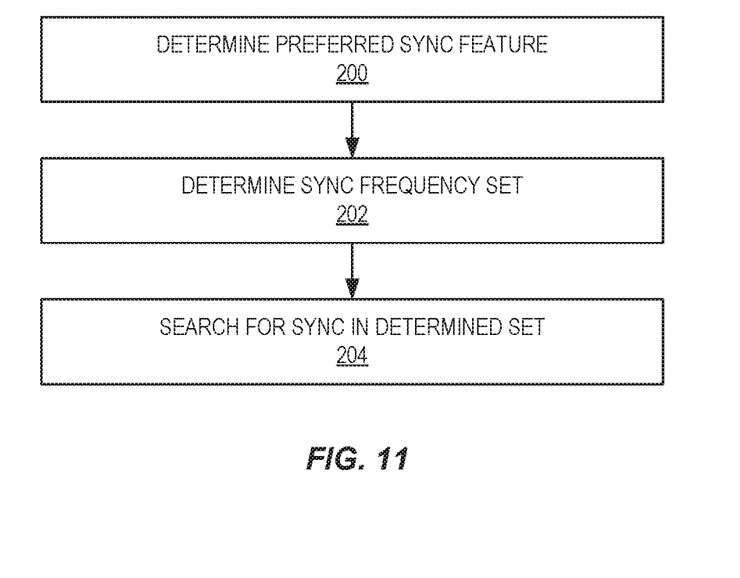
FIG. 11 is a flow chart that illustrates the operation of a device (e.g., a User Equipment device (UE)) according to some embodiments of the present disclosure.

FIG. 11 is a flow chart that illustrates the operation of a UE (e.g., the UE 16) according to some embodiments of the present disclosure. As illustrated in FIG. 11, the corresponding UE sync detection method starts by determining a preferred sync signal feature (step 200). This feature may be, e.g., a sync signal with an extended sync periodicity, due to, e.g., a preference to connect to a national Mobile Broadband (MBB) cellular network. However, other examples of the sync signal feature are described above. Note that while a preferred sync signal feature is used in this example, the UE may determine a set of preferred sync signal features, where this set of sync signal features includes one or more sync signal features. Note that with respect to determining the preferred sync signal feature, a standard UE (e.g., a cell phone) will know that a nationwide network will prefer sync periods with a long periodicity and start searching on these positions. Similarly, narrowband IoT devices may only be able to connect via narrowband syncs (due to, e.g., bandwidth limitations).

Based on the determined preferred sync feature, the UE identifies a set of sync frequency locations within which the sync signals with the preferred sync signal feature may reside (step 202). The set of sync frequency features for the determined preferred sync signal feature(s) may be determined using any suitable technique. For example, as described above, different sets of sync frequency locations within the cellular band may be predefined (e.g., by a standard, a mathematical formula, or the like) for different sets of sync signal features. The UE may then use the determined preferred sync signal feature(s) to identify the predefined set of sync frequency locations within the cellular band for the determined preferred sync signal feature(s). Finally, the UE starts searching for sync signals on the determined set of sync frequency locations (step 204). This search may use any suitable searching scheme such as, but not limited to, any search scheme used in conventional 3GPP techniques to search for Primary Synchronization Signal PSS and Secondary Synchronization Signal (SSS).

In some embodiments, the sync search procedure is modified according to the preferred sync signal feature(s). In particular, the sync search interval may be extended when searching for a sync signal with a higher sync period than otherwise is usual (e.g., a sync period that is greater than a predefined or preconfigured threshold).

In some other embodiments, the (first) set of sync frequency locations determined in step 202 may be a subset of a second set of sync frequency locations. In that case, the (first) set of sync frequency locations may be evenly distributed as every $k^{th}$ sync frequency location, and where k is an integer, k≥1.

In some other embodiments, the (first) set of sync frequency locations determined in step 202 may be based on one of multiple hierarchy levels in a hierarchical sync allocation scheme (see FIG. 10 as an example). For example, the preferred sync signal feature determined in step 200 may be limited to a higher hierarchical level that defines the (first) set of sync frequency locations. In such a case, higher hierarchical levels may imply, e.g., a longer sync period, whereas lower hierarchical levels may imply, e.g., a shorter sync period.

Figure 12:
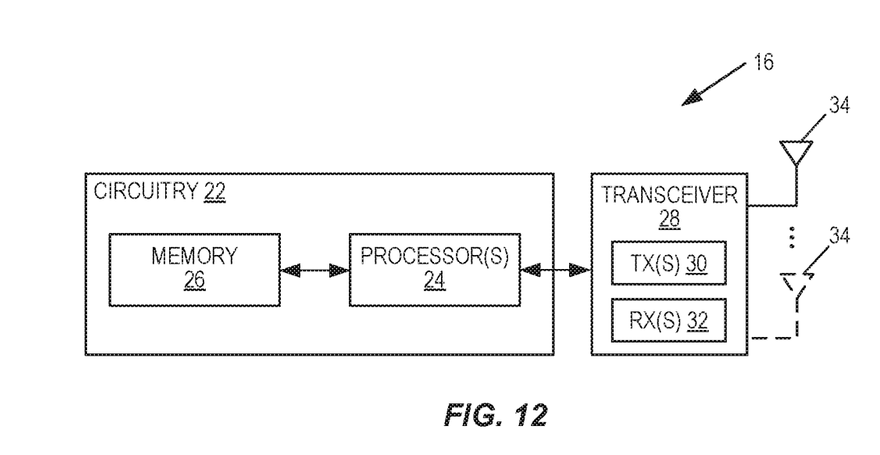
FIGS. 12 and 13 illustrate example embodiments of a wireless communication device.

FIG. 12 is a schematic block diagram of the UE 16 (or more generally a wireless communication device) according to some embodiments of the present disclosure. As illustrated, the UE 16 includes circuitry 22 comprising one or more processors 24 (e.g., Central Processing Units (CPUs), Application Specific Integrated Circuits (ASICs), Field Programmable Gate Arrays (FPGAs), and/or the like) and memory 26. The UE 16 also includes one or more transceivers 28 each including one or more transmitter 30 and one or more receivers 32 coupled to one or more antennas 34. In some embodiments, the functionality of the UE 16 described above may be fully or partially implemented in software that is, e.g., stored in the memory 26 and executed by the processor(s) 24.

In some embodiments, a computer program including instructions which, when executed by the at least one processor 24, causes the at least one processor 24 to carry out the functionality of the UE 16 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
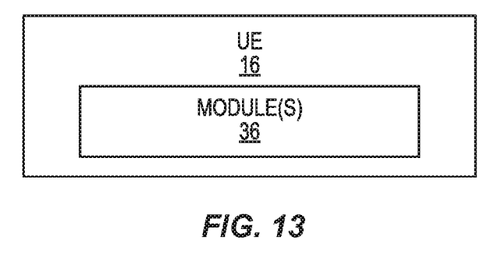

FIG. 13 is a schematic block diagram of the UE 16 (or more generally a wireless device) according to some other embodiments of the present disclosure. The UE 16 includes one or more modules 36, each of which is implemented in software. The module(s) 36 provide the functionality of the UE 16 described herein. The module(s) 36 may comprise a first determining module operable to perform step 200 of FIG. 11, a determining module operable to perform step 202 of FIG. 11, and a searching module operable to perform step 204 of FIG. 11.

Figure 14:
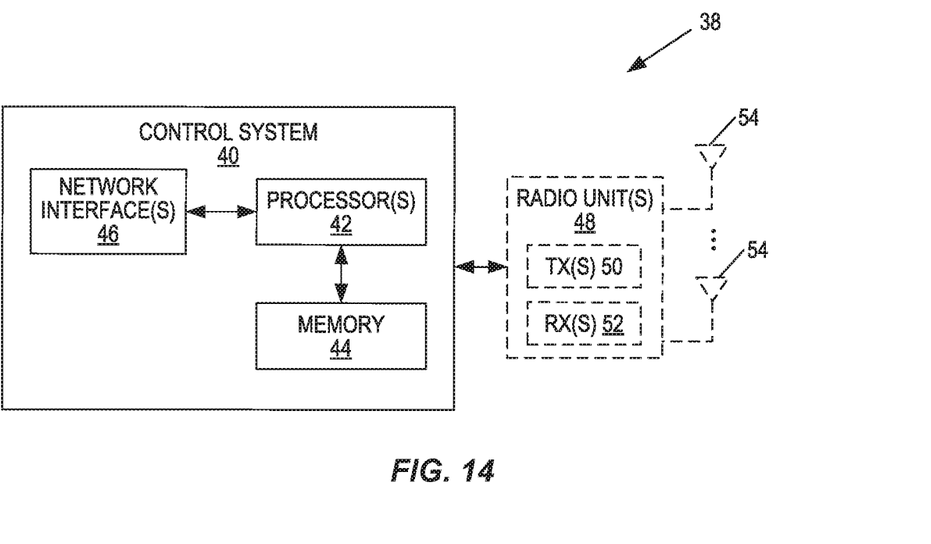
FIGS. 14 through 16 illustrate example embodiments of a network node.

FIG. 14 is a schematic block diagram of a network node 38 (e.g., a radio access node 14) according to some embodiments of the present disclosure. As illustrated, the network node 38 includes a control system 40 that includes circuitry comprising one or more processors 42 (e.g., CPUs, ASICs, FPGAs, and/or the like) and memory 44. The control system 40 also includes a network interface 46. In embodiments in which the network node 38 is a radio access node 14, the network node 38 also includes one or more radio units 48 that each include one or more transmitters 50 and one or more receivers 52 coupled to one or more antennas 54. In some embodiments, the functionality of the network node 38 described above may be fully or partially implemented in software that is, e.g., stored in the memory 44 and executed by the processor(s) 42.

Figure 15:
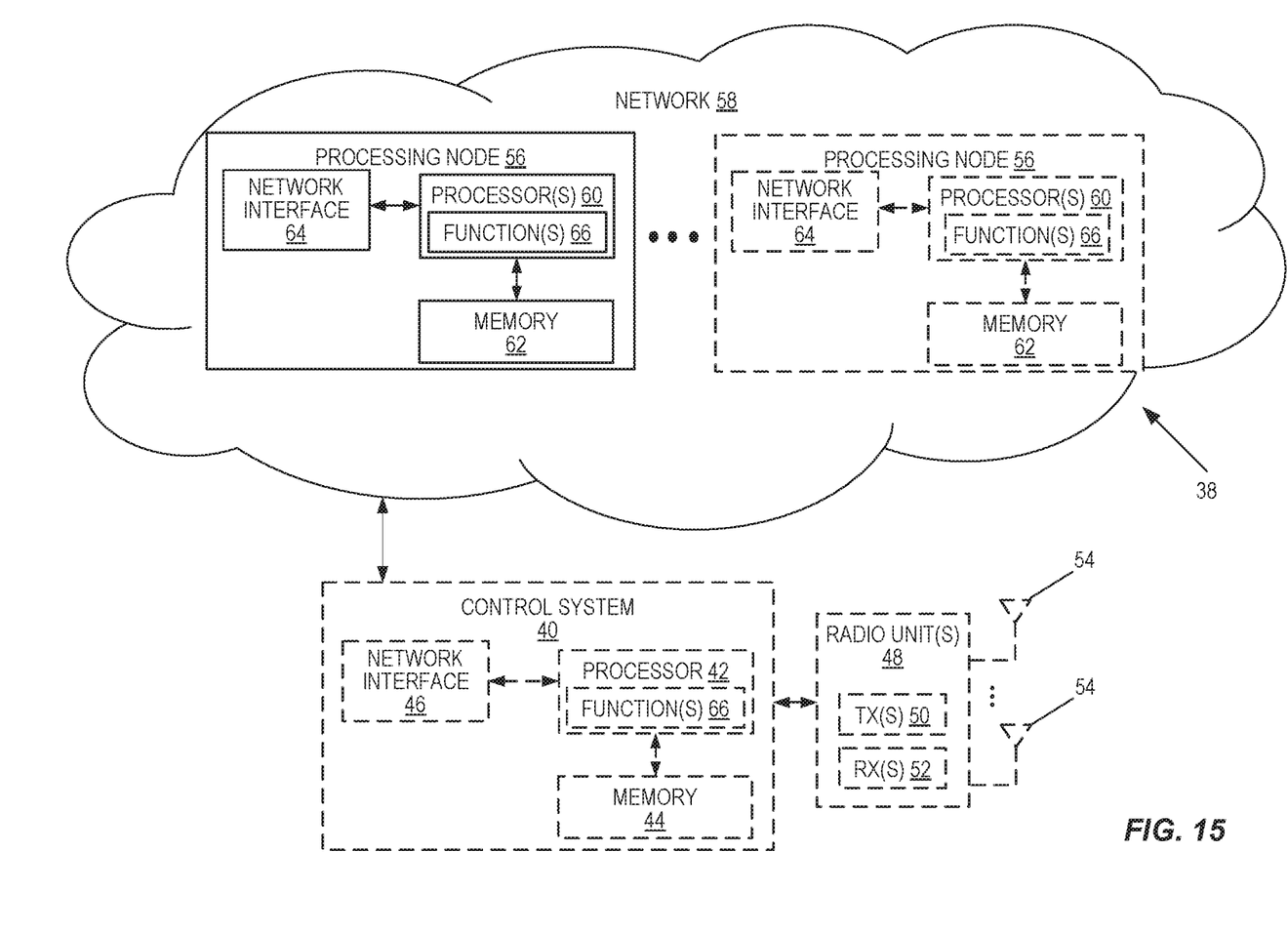

FIG. 15 is a schematic block diagram that illustrates a virtualized embodiment of the network node 38 (e.g., the radio access node 14) according to some embodiments of the present disclosure. As used herein, a "virtualized" network node 38 is a network node 38 in which at least a portion of the functionality of the network node 38 is implemented as a virtual component (e.g., via a virtual machine(s) executing on a physical processing node(s) in a network(s)). As illustrated, the network node 38 optionally includes the control system 40, as described with respect to FIG. 14. In addition, if the network node 38 is the radio access node 14, the network node 38 also includes the one or more radio units 48, as described with respect to FIG. 14. The control system 40 (if present) is connected to one or more processing nodes 56 coupled to or included as part of a network(s) 58 via the network interface 46. Alternatively, if the control system 40 is not present, the one or more radio units 48 (if present) are connected to the one or more processing nodes 56 via a network interface(s). Alternatively, all of the functionality of the network node 38 described herein may be implemented in the processing nodes 56 (i.e., the network node 38 does not include the control system 40 or the radio unit(s) 48). Each processing node 56 includes one or more processors 60 (e.g., CPUs, ASICs, FPGAs, and/or the like), memory 62, and a network interface 64.

In this example, functions 66 of the network node 38 described herein are implemented at the one or more processing nodes 56 or distributed across the control system 40 (if present) and the one or more processing nodes 56 in any desired manner. In some particular embodiments, some or all of the functions 66 of the network node 38 described herein are implemented as virtual components executed by one or more virtual machines implemented in a virtual environment(s) hosted by the processing node(s) 56. As will be appreciated by one of ordinary skill in the art, additional signaling or communication between the processing node(s) 56 and the control system 40 (if present) or alternatively the radio unit(s) 48 (if present) is used in order to carry out at least some of the desired functions. Notably, in some embodiments, the control system 40 may not be included, in which case the radio unit(s) 48 (if present) communicates directly with the processing node(s) 56 via an appropriate network interface(s).

In some embodiments, a computer program including instructions which, when executed by the at least one processor 60, causes the at least one processor 60 to carry out the functionality of the network node 38 or a processing node 56 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 62).

Figure 16:
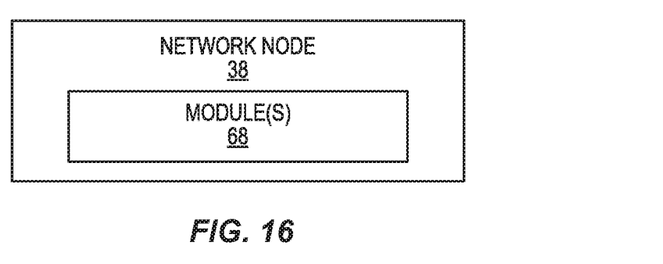

FIG. 16 is a schematic block diagram of the network node 38 (e.g., the radio access node 14) according to some other embodiments of the present disclosure. The network node 38 includes one or more modules 68, each of which is implemented in software. The module(s) 68 provide the functionality of the network node 38 described herein. The module (s) 68 may comprise a first determining module operable to perform step 100 of FIG. 6, a second determining module operable to perform step 102 of FIG. 6, and a transmitting module operable to perform step 104 of FIG. 6.

Advantageously, the conflicting sync requirements can be met by allowing deviating or alternating sync signal properties at a subset of the raster points according to the embodiments presented herein. This will allow for a reduced UE complexity while maintaining gNB lean power requirements for e.g. nationwide MBB networks.

Those skilled in the art will recognize improvements and modifications to the embodiments of the present disclosure. All such improvements and modifications are considered within the scope of the concepts disclosed herein.

The invention claimed is:

1. A method of operation of a network node in a wireless communications network, comprising:
   determining a set of sync signal features of different sets of sync signal features for a sync signal to be transmitted by either the network node or another network node;
   determining a sync frequency location for the sync signal based on the set of sync signal features for the sync signal to be transmitted; and
   transmitting or causing transmission of the sync signal on the sync frequency location;
   wherein:
      determining the sync frequency location comprises:
         determining a set of sync frequency locations defined for the set of sync signal features within a cellular band; and
         determining the sync frequency location for the sync signal to be transmitted from the defined set of sync frequency locations;
      the set of sync frequency locations is a subset of a set of all sync frequency locations allowed for the cellular band and comprises every $k^{th}$ sync frequency location in the set of all sync frequency locations allowed for the cellular band;
      the set of all sync frequency locations is an ordered list of all sync frequency locations allowed for the cellular band; and
      k is an integer equal to or greater than one (1).

2. The method of claim 1 wherein different sets of sync frequency locations are defined for the different sets of sync signal features.

3. The method of claim 2 wherein the different sets of sync frequency locations are defined according to a hierarchical tree such that the different sets of sync frequency locations correspond to different subsets of a plurality of levels in the hierarchical tree.

4. The method of claim 3 wherein the different sets of sync frequency locations are assigned different priority levels within the hierarchical tree.

5. The method of claim 1 wherein the set of sync frequency locations are defined according to a first raster that is wider than (e.g., a multiple of) a narrower raster that defines a second set of sync frequency locations for a different set of sync signal features.

6. The method of claim 1 wherein a second set of sync frequency locations is defined for a second set of sync signal features, and a first sync frequency location in the second set of sync frequency locations is offset by a predefined or preconfigured value m relative to a first sync frequency location in the set of sync frequency locations.

7. The method of claim 1 wherein the set of sync signal features comprises one or more sync signal features for the sync signal to be transmitted.

8. The method of claim 7 wherein the one or more sync signal features for the sync signal comprise at least one of: a bandwidth of the sync signal, a periodicity of the sync signal, a time duration of the sync signal, a frequency raster of the sync signal, a waveform of the sync signal, and an interpretation of the sync signal.

9. A network node for a wireless communications network, comprising:
   at least one processor;
   memory comprising instructions executable by the at least one processor whereby the network node is operable to:
      determine a set of sync signal features of different sets of sync signal features for a sync signal to be transmitted by either the network node or another network node;
      determine a sync frequency location for the sync signal based on the set of sync signal features for the sync signal to be transmitted; and
      transmit or cause transmission of the sync signal on the sync frequency location; wherein:
      the network node is operable to determine the sync frequency location by being operable to:
         determine a set of sync frequency locations defined for the set of sync signal features within a cellular band; and
         determine the sync frequency location for the sync signal to be transmitted from the defined set of sync frequency locations;
      the set of sync frequency locations is a subset of a set of all sync frequency locations allowed for the cellular band and comprises every $k^{th}$ sync frequency location in the set of all sync frequency locations allowed for the cellular band;

the set of all sync frequency locations is an ordered list of all sync frequency locations allowed for the cellular band; and k is an integer equal to or greater than one (1).

10. A method of a wireless communication device for performing synchronization to a wireless communications network, comprising:
 determining a set of sync signal features of different sets of sync signal features for a sync signal to be searched for by the wireless communication device;
 determining a set of sync frequency locations defined for the set of sync signal features for a cellular band; and
 searching for a sync signal in the set of sync frequency locations;
 wherein:
  the set of sync frequency locations is a subset of a set of all sync frequency locations allowed for the cellular band and comprises every $k^{th}$ sync frequency location in the set of all sync frequency locations allowed for the cellular band;
  the set of all sync frequency locations is an ordered list of all sync frequency locations allowed for the cellular band; and
  k is an integer equal to or greater than one (1).

11. The method of claim 10 wherein searching for the sync signal comprises searching for the sync signal using a search procedure that is modified based on the set of sync signal features.

12. The method of claim 11 wherein the set of sync signal features comprises a sync period for the sync signal to be searched for by the wireless communication device, and the search procedure is modified based on the sync period.

13. The method of claim 10 wherein a second set of sync frequency locations is defined for a second set of sync signal features, and a first sync frequency location in the second set of sync frequency locations is offset by a predefined or preconfigured value m relative to a first sync frequency location in the set of sync frequency locations.

14. The method of claim 10 wherein the set of sync frequency locations is defined by a hierarchical level in a hierarchical tree that defines a set of all allowed sync frequency locations for the cellular band.

15. The method of claim 14 wherein higher levels in the hierarchical tree imply one set of sync signal features (e.g., a longer sync period).

16. The method of claim 10 wherein different sets of sync frequency locations are defined for the different sets of sync signal features.

17. The method of claim 16 wherein the different sets of sync frequency locations are defined according to a hierarchical tree such that the different sets of sync frequency locations correspond to different subsets of a plurality of levels in the hierarchical tree and higher levels in the hierarchical tree are assigned higher priority levels.

18. The method of claim 17 wherein the different sets of sync frequency locations are assigned different priority levels in the hierarchical tree.

19. The method of claim 10 wherein the set of sync frequency locations are defined according to a first raster that is wider than (e.g., a multiple of) a narrower raster that defines a second set of sync frequency locations for a different set of sync signal features.

20. The method of claim 10 wherein the set of sync signal features comprises one or more sync signal features for the sync signal to be transmitted.

21. The method of claim 20 wherein the one or more sync signal features for the sync signal comprise at least one of: a bandwidth of the sync signal, a periodicity of the sync signal, a time duration of the sync signal, a frequency raster of the sync signal, a waveform of the sync signal, and an interpretation of the sync signal.

22. A wireless communication device for a wireless communications network, comprising:
 at least one processor;
 memory comprising instructions executable by the at least one processor whereby the wireless communication device is operable to:
  determine a set of sync signal features of different sets of sync signal features for a sync signal to be searched for by the wireless communication device;
  determine a set of sync frequency locations defined for the set of sync signal features for a cellular band; and
  search for a sync signal in the set of sync frequency locations;
 wherein:
  the set of sync frequency locations is a subset of a set of all sync frequency locations allowed for the cellular band and comprises every $k^{th}$ sync frequency location in the set of all sync frequency locations allowed for the cellular band;
  the set of all sync frequency locations is an ordered list of all sync frequency locations allowed for the cellular band; and
  k is an integer equal to or greater than one (1).

\* \* \* \* \*